United States Patent Office 3,699,052
Patented Oct. 17, 1972

3,699,052
CORROSION INHIBITOR COMPOSITION CONTAINING A GLYCINE, CHELATING AGENT, PHOSPHORIC OR BORIC ACID ESTER, AND A WATER SOLUBLE DIVALENT METAL SALT
Ernest Quentin Petrey, Jr., Randolph Township, and Ronald M. Werner, West Paterson, N.J., assignors to Drew Chemical Corporation, New York, N.Y.
No Drawing. Filed Nov. 12, 1969, Ser. No. 876,080
Int. Cl. C23f 11/14, 11/16
U.S. Cl. 252—389
34 Claims

ABSTRACT OF THE DISCLOSURE

A multi-functional corrosion inhibitor which comprises a divalent metal ion, chelating agent, a trivalent inorganic acid ester, and an amino acid or a derivative thereof, and the process of utilizing said corrosion inhibitor in a multitude of non-related applications.

---

This application relates to methods of inhibiting metallic corrosion and perhaps the deposition of scale on metallic surfaces subject to the presence of water or water vapor, and to compositions for accomplishing such effect. More specifically the compositions of this invention provide improved corrosion inhibition and passivation of a wide variety of metallic surfaces. The compositions are non-toxic to lower mammalian and aquatic life, and externally to humans. Furthermore, the compositions contain no components which revert to undesirable products, and can be utilized under a multiplicity of operating or environmental conditions.

One of the more widely used systems for treating aqueous systems, by which we mean metallic surfaces not of necessity enclosed subject to corrosion by the presence of water or water vapor, consists of incorporating into the system small amounts of a molecularly dehydrated alkali metal polyphosphate in combination with a soluble inorganic chromate, such as sodium dichromate. This is known in the art as the "polychrome" treatment, which while effective in the control of metal corrosion, is subject to many disadvantages.

One of the major disadvantages of this treatment is the fact that the chromates are quite toxic and their use in systems which are eventually diverted into natural water sources has been substantially curtailed by local regulation.

Secondly, the condensed phosphate component of these compositions revert to orthophosphates, which will react with divalent alkaline earth, and trivalent amphoteric metal ions present in the aqueous system to form deposits of for example calcium or aluminum orthophosphate which diminish the corrosion inhibiting characteristics of the treatment.

Other corrosion inhibitor compositions which contain one or both of the chromate or condensed phosphates are similarly subject to the disadvantages set forth above.

A further disadvantage of these and other prior art corrosion inhibitors is their inability to function under a variety of adverse environmental conditions. Certain of the prior art inhibitor compositions are further limited in that they can be utilized with but one type of metal.

Different compounds act as corrosion inhibitors for different metals. Oft times aqueous systems are made up of more than one metal. Therefore, to assure maximum corrosion inhibition, it is beneficial to utilize a corrosion inhibitor composition which will protect a variety of metals and preferably be effective under diverse operating conditions. Thus sodium mercaptobenzothiazole or benzotriazole are often utilized as corrosion inhibitors for copper, sodium dichromate for mild steel, and sodium borate together with sodium nitrate as an inhibitor for cast iron. It is seen, that merely combining known individual metal corrosion inhibitors will not give adequate protection under a variety of conditions without the disadvantages set forth previously. By use of the compositions of this invention a multi-metallic aqueous system can be protected against corrosion under diverse operating conditions, but without the disadvantages of toxicity formation of undesirable products and which present no safety hazard in handling.

Accordingly, it is an object of this invention to provide an improved composition for the prevention of corrosion in or on an aqueous system.

Another object is to provide an improved inhibitor composition which is non-toxic and which does not give rise to undesirable by-products.

Still another object of the invention is to provide an aqueous systems treatment composition which will function under a wide variety of adverse operating conditions, and which can be utilized with a multiplicity of metals.

A further object is to provide an aqueous systems corrosion inhibitor which can be utilized in a plurality of applications.

A further object of this invention is to provide an improved inhibitor composition which can be utilized in several forms, such as and including powder, liquid, particulate, and dispersion.

Another object is to provide an aqueous systems corrosion inhibitor composition which can be applied on a one shot basis, by continuous feeding, or by intermittent addition.

An additional object of this invention is to provide a method of inhibiting corrosion in aqueous systems.

Yet another object is to provide a method of preventing corrosion on metallic surfaces.

A still further object is to provide a method of inhibiting corrosion on metallic surfaces which are found in a wide variety of industrial and commercial applications.

An additional object is to provide an aqueous systems treatment composition which can be utilized without the formation of undesirable side products and which can be handled safely and which will not be toxic to man and his environment.

Other objects of the invention will in part be obvious and will in part appear hereinafter.

The invention aaccordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, references should be had to the following detailed description.

One aspect of this invention is the provision of a corrosion inhibitor composition comprising: (I) A water soluble divalent metal, (II) a water soluble chelating agent, (III) a trivalent inorganic acid ester, (IV) and an amino acid or derivative thereof of the nature to be defined below.

The divalent metal ions (I) may be derived from any water soluble salt of zinc, cadmium, copper, nickel, strontium and mixtures thereof. The concentration of the divalent metal ion in the formulation for the composition should be within the range 0.5 to about 5 parts per 100 parts of total composition. Little if any operational advantage is derived from utilizing more than about 5 parts of divalent metal ion per 100 parts of composition.

The chelating agent utilizable herein is selectable from among any of the wide variety of water soluble chelating agents presently, or contemplated to be available in the marketplace, so long as it is compatible with the other components of the composition and with the metal surface being treated. Representative classes of these compounds include but are not limited to: (1) polycarboxylic-polyamine compounds, (2) hydroxy polycarboxcyclic acids, (3) nitrilo polyacetic acids and (4) aminoalkylphosphonic acids; and salts thereof.

Among the polycarboxylic polyamine compounds which can be represented by the following structural formula:

$$X - \left[ \begin{matrix} Y \\ | \\ N-R \\ | \end{matrix} \right]_n \begin{matrix} Y \\ | \\ N-Y \end{matrix}$$

where X is $-CH_2COOM$ or $-CH_2CH_2COOM$; Y is the same or different members of the group consisting of $-H$, $-CH_2COOM$, $-CH_2CH_2COOM$, wherein M is $-H$, $-CH_2CH_2OH$, an alkali metal, or ammonium radical; R is a hydrocarbon group containing from 2 to 6 atoms; and $n$ is an integer from 0 to 4.

Mention may be made of ethylenediamine tetraacetic acid, ethylenediamine triacetic acid, triethylenetetramine tetraacetic and pentacetic acid, ethanol ethylenediamine triacetic acid, diethanol diethylene triamine triacetic acid, diethylene triamine pentapropionic acid, ethylene diamine triacetic acid of representative chelants of class (1).

Among the hydroxy polycarboxylic acid chelating agents, which are class (2) chelants, mention may be made of citric, tartaric, gluconic, glucoheptonic and saccharic acid, and their water soluble alkali, and ammonium salts.

Within the class (3) chelating agents, which is the class of nitrilo polyacetic acids; typical members include nitrilodiacetic acid, nitrilotriacetic acid, nitrilo dipropionic acid, etc.

The fourth class of chelating agents utilizable herein are the amino lower alkylphosphonic acids or their salts. These compounds are more fully described in U.S. Pat. No. 3,234,124. The sodium, potassium, and ammonium salts of such acids may also be used. The chelating agents are used in a range of about 2.5 to about 15 parts by weight based upon 100 parts by weight of total composition. No particular advantage exists from the use of higher amounts of chelant.

The third component of the composition is a trivalent acid ester. These are prepared by the reaction of an inorganic acid which contains either of phosphorus, or boron in the trivalent state, with a compound that contains at least one available hydroxyl group. Of these, mention may be made of octyl and nonyl alcohols; phenols, such as nonylphenol; ethylene glycol, triethanol amine, diethylene glycol, ethoxylated fatty acids, such as ethoxylated stearic acid.

The trivalent acid ester is used in the range about 7.5 to about 30 parts by weight per 100 parts of total composition.

The fourth component, the amino acid or derivative is represented by the following formula:

$$X - N - (CH_2)_m - \overset{O}{\underset{\|}{C}} - O - Y$$
$$\begin{matrix} | \\ Z \\ | \\ (CH_2)_n \\ | \\ CH_2 \end{matrix}\bigg]_q$$
$$H$$

wherein, Y is H, alkali metal or an ammonium radical; Z is any of $$-\overset{O}{\underset{\|}{S}}-, \quad -\overset{O}{\underset{\|}{C}}-NH-, \quad -\overset{O}{\underset{\|}{C}}-, \quad -\overset{O}{\underset{\|}{P}}-O- \atop OH$$

X is H, or an alkyl group containing from 1 to 6 carbon atoms, $m$ is an integer of from 1 to 6, $n$ is a number from 0 to six inclusive and when $n$ is six, the six carbon atoms may be present as an alkylene, cycloalkylene or an arylene group, each with the requisite number of hydrogen atoms needed for that group, and $q$ is 1 or 0. Typical compounds are sodium alkyl sulfonyl glycine, N-paratoluenesulfonyl glycine, and glycine.

This component is used in a range of from about 50 to 89.5 parts by weight per 100 parts of composition.

It has been found that the compositions as just previously described can be utilized in a multitude of applications for the prevention and inhibition of corrosion. These applications include industrial cooling water systems; the cooling loops of nuclear reactors; the pumps piping, and other metallic equipment normally associated with oil wells and oil pipelines; metal surfaces which are subject to contact by brine or salt water, such as for example commercial refrigeration systems and ship ballasting tanks; in the cooling jacket(s) and associated auxiliary equipment such as water pump, heat exchanger, etc. of gasoline and diesel engines; other dissimilar metal junctions subject to the presence of water or moisture, such as process piping wherein steel is joined to copper; installations of metal such as stainless steel which are subject to stress corrosion cracking; as well as for the protection of similar or dissimilar metallic surfaces which are subject to atmospheric corrosion.

In operation upon application, be the application in solid, paste, liquid, dispersion or from a solvent, a nonstrippable substantially impervious coating is formed on the metallic surface which has been subjected to the composition. Among the metals upon which such a film or coating can be formed are stainless steel, mild steel, copper, aluminum, and brass.

It has been found that in aqueous systems such as piping that is subject to alternate drainage and refilling that protection is continued subsequent to drainage, a benefit unknown in the prior art.

The compositions of this invention are prepared from the four essential ingredients.

In brief, the divalent ion salt, the chelating agent, the trivalent inorganic acid ester and the amino acid are mixed together under ambient temperature and pressure, to yield the composition. The ultimate physical form of the composition is dependent upon the physical state of the constituents. Thus, for example, a composition based upon N-alkyl sulfonyl glycine, zinc sulfate, ethylene diamine tetraacetic acid, and the phosphoric acid ester of octyl alcohol will be prepared in paste form. Whereas, if zinc chloride, nitriol-triacetic acid, the boric acid ester of nonyl phenol, and glycine are used, a coarse granular product is prepared.

The following non-limiting examples illustrate the prepation of compositions within the scope of this invention.

EXAMPLE I

Into a vessel are placed about:

300 grams of N-alkyl sulfonyl glycine
60 grams of the phosphoric acid ester of octyl alcohol
30 grams of E.D.T.A., and
6 grams of zinc sulfate monohydrate and subjected to mixing by mechanical agitation for about 15 minutes. A substantially uniform paste has formed.

EXAMPLE II

Another composition is prepared which results in a paste, wherein amino trimethylphosphoric acid is substituted on an active basis in the same proportion for the E.D.T.A.

EXAMPLE III

A dispersion of the composition of Example I was prepared by mixing 60 parts of the paste with 40 parts of a light petroleum hydrocarbon oil, such as Gulf 2209 oil. It is to be understood that when utilized in this state, the nontoxic composition is rendered toxic by the presence of the oil.

EXAMPLE IV

A composition was prepared in paste form from the ingredients and amounts as in Example I, but with the substitution of 2 grams of copper sulfate for the 6 grams of zinc sulfate monohydrate.

Utilizing a simple mixing procedure an inhibitor composition of the following formulations can be prepared.

EXAMPLE V

|  | Grams |
| --- | --- |
| Nickelous sulfate | 3 |
| E.D.T.A. | 15 |
| Phosphoric acid ester of nonyl phenol | 15 |
| Para-aminobenzoyl glycine | 67 |

EXAMPLE VI

|  | Grams |
| --- | --- |
| Cadmium chloride | 0.5 |
| N.T.A. | 2.5 |
| Boric acid ester of ethylene glycol | 20.0 |
| Glycine | 77.0 |

The compositions of this invention are utilized in varying proportions, dependent upon the nature of the application.

Thus in an industrial cooling water system, one would add about 100 to about 4,000 parts of the inhibitor composition per million parts of water within the system. On an economic basis, a range of from about 500 to 2,000 parts per million parts of water is preferred.

In a nuclear reactor, where it is desired to protect the cooling loops which are subject to corrosion from the demineralized water circulating therein, about 200 to 1,000 parts of inhibitor would be added to the water.

In oil well applications, where it is desired to protect the pump, valves, lines and casing, approximately 100 to 1,000 parts to the annular space between the shaft and the casing are added.

In stainless steel heat exchangers, and other apparatuses subject to stress corrosion cracking, approximately 100 to 500 parts of inhibitor are added to about 1 million parts of circulating liquid.

For engine jacket applications, wherein the system is analogous to an industrial cooling water system similar amounts of inhibitors are to be used.

Aqueous systems, such as enclosed brine, refrigerating systems can be protected by incorporating about 100 to 300 parts of inhibitor into a million parts of brine.

Salt water systems which are "open," i.e. are subject to alternate wetting and drying. For example, the ballast tanks of an ocean going vessel, can be protected by the application of the compositions of this invention directly to the metallic surfaces. This can be accomplished by coating the metal with a solution or dispersion containing inhibitor. An alternative means of protection is by the introduction of inhibitor into the tank during or after filling. Approximately ½ pound of inhibitor is added per ton of sea water in the tank.

In process piping wherein two or more dissimilar metals are joined, corrosion can occur. To prevent this, inhibitor is added to the process stream. Methods of prevention of contamination of the process stream are within the skill of the art. Approximately 500 to 4,000 parts inhibitor are added to the stream. The requirement for a higher proportion of inhibitor for this application is due to the aggravated rate of corrosion at the point of junction.

Another example of a dissimilar metal junction which is subject to corrosion would be a copper roof which is secured in place by steel nails. Coating of the nails would inhibit corrosion.

Exposed metal surfaces which are subject to atmospheric corrosion can have this corrosion inhibited by treatment with the compositions of this invention. For example, ship compartments, which are usually metal lined and which is subject to atmospheric corrosion can be protected by a coating. For such purposes inhibitor is dispersed in an adhering medium.

Another example of an exposed metal surface upon which corrosion can be inhibited by treatment with the instant compositions are the disassembled parts of large internal combustion engines at locations where it is considered undesirable to coat with a non-water soluble product. For example, the cooling system should be kept free from petroleum products. Thus, prior to disassembly while on the test rack, the compositions of this invention are added to the cooling water, circulated therethrough and removed such that a permanent impervious corrosion preventing film remains on the metal surfaces.

Stress corrosion cracking occurs in stainless steel and other metallic surfaces which are subject to stress, and which are subject to halide ions. For example in a heat exchanger wherein chloride ion is present in the circulating liquid, small intergranular cracks occur. It is the belief of the inventors that the compositions of this invention are the first effective means of controlling such corrosion.

In order to demonstrate that the compositions of this invention do in fact inhibit stress corrosion, stainless steel coupons were cleaned, notched to induce the cracking upon stressing, stressed and subjected to a corrosive environment, which contained 500 p.p.m. of chloride ion in distilled water for a period of three days. Upon removal the coupons were examined with a microscope to determine the extent of stress corrosion cracking.

The following example illustrates the mode of preparation of stainless steel coupons such that they will undergo stress corrosion cracking when subjected to the proper environment.

EXAMPLE VII

Method

1" x 4" x 1/16" coupons are cleaned to remove surface grime and contaminants. They are rinsed with distilled water, dipped in methanol and air dried. A V-notch is made in the center of the coupon with triangular file. The coupons are pickled in a 10% nitric acid solution for one hour at room temperature. Upon removal they are rinsed with distilled water, dipped in methanol and air dried. The coupons are bent into a horseshoe shape around a 3/8" mandrel until the ends are about 3/4" apart. The ends are bolted together with a stainless steel nut and bolt. Torquing is carried out to 32 inch-ounces. The thus prepared coupons are placed in a desiccator until ready for use.

EXAMPLE VIII

The coupons of Example VII were tested for stress corrosion cracking by immersing a multiplicity of them into different test environmental baths as shown in the chart below for three days, under continuous rotation to simulate the flow characteristics of a tank or pipe.

In the tests, the water utilized was deionized water, to which, where indicated, chloride ion was added in the form of sodium chloride.

The pH of the deionized water was 6.5. Where pH is below 6.5 it was adjusted by the addition of A.C.S. Reagent Grade sulfuric acid. Where pH is above 6.5 it was adjusted by the addition of A.C.S. Reagent Grade sodium hydroxide.

Where indicated, oxygen free water was obtained by a continuous purge of the water by nitrogen gas.

All tests were conducted at ambient temperature.

The $PO_4^=$ ion utilized was added in the form of sodium tripolyphophate.

The nitrite/borate inhibitor utilized was a commercially available corrosion inhibitor comprising about 75% sodium nitrite, 25% sodium metaborate.

The term "invention composition" as set forth in the table refers to an inhibitor composition of the following formulation:

| | Parts |
|---|---|
| N-alkyl sulfonyl glycine | 45.45 |
| Phosphoric acid ester of octyl alcohol | 9.09 |
| Zinc sulfate monohydrate | 0.91 |
| E.D.T.A. | 4.55 |
| | 60.00 |

| Test number | Additive | Oxygen free water | Chloride ion concentration, p.p.m. | pH | Results |
|---|---|---|---|---|---|
| 1 | 1,000 p.p.m. PO₄ | Yes | 500 | 10.5 | Hairline cracks. |
| 2 | None | Yes | 500 | 10.5 | Cracking. |
| 3 | 1,000 p.p.m. PO₄ | No | 500 | 10.5 | Slight cracking. |
| 4 | None | No | 500 | 10.5 | Severe cracking. |
| 5 | 2,000 p.p.m. nitrite/borate | Yes | 500 | 10.5 | Do. |
| 6 | do | No | 500 | 10.5 | Do. |
| 7 | 60 p.p.m. invention composition | Yes | 500 | 3.5 | Slight cracking. |
| 8 | do | Yes | 500 | 6.5 | Do. |
| 9 | do | Yes | 500 | 8.5 | No cracking. |
| 10 | do | No | 500 | 3.5 | Slight cracking. |
| 11 | do | No | 500 | 6.5 | Do. |
| 12 | do | No | 500 | 8.5 | No cracks. |
| 13 | None | No | 0 | 3.0 | No cracking. |
| 14 | do | No | 500 | 3.0 | Severe cracking. |
| 15 | do | No | 0 | 10.5 | No cracking. |
| 16 | do | No | 500 | 10.5 | Severe cracking. |

It is known that metal surfaces which have been subjected to a corrosion inhibitor treatment, will when removed from the protecting system, corrode at a rate faster than similar metal surfaces which have not been previously protected by an inhibitor.

It was unexpectedly found that metals which have been previously protected by the application of the instant compositions will retain a residual film which substantially inhibits corrosion. Under certain circumstances these residual coatings have been shown to last up to eight months.

The following example is intended to show that metal surfaces when exposed to certain atmospheric conditions after treatment with these compositions show substantially no corrosion after 30 days.

EXAMPLE IX

A composition prepared according to the invention was mixed with standard hard water such that solutions containing 720 and 900 parts of composition per million parts of water were prepared in view of the fact that inside surfaces of pipe would be difficult to evaluate, mild steel (S.A.E. 1010) coupons (1 x 3 x 1/16 inches) were maintained at 180° F., in these two solutions as well as in a control. To simulate water movement the coupons were rotated in the solutions.

After this period of time, they were removed, and subjected to contact with the atmosphere for 30 days.

| Environment | 0 p.p.m. | 720 p.p.m. | 900 p.p.m. |
|---|---|---|---|
| Inside, m.p.y | 7.0 | 0.02 | 0.90 |
| Outside covered, m.p.y | 140.7 | 0.19 | 0.20 |
| Outside uncovered, m.p.y | 186.0 | 0.66 | 0.23 |

Inside=Airconditioned chamber.
Outside covered=Exposed to atmosphere but shielded from direct contact by sun, wind and precipitation.
Outside uncovered=Unshielded.
M.p.y.=mills per year of weight loss.

Another feature of this invention is that compositions of this invention will prevent corrosion of metallic surfaces which are in contact with brine solutions. These brine solutions are used as heat transfer agents, for example in commercial refrigeration systems. These piping, valves, etc. of such systems which are of metallic construction will if left untreated, corrode.

A common inhibitor in use in such systems for corrosion prevention is the "soluble chromate" type of inhibitor. While the use of this type of inhibitor will result in satisfactory corrosion protection, its inherent toxicity represents a health and safety hazard, should a leak develop as well as at the time of drainage of the system for repair or inspection. Furthermore, it is known that chromates cannot be drained into potential potable or inhabitable water systems.

The application of the product of this invention to such brine heat transfer systems give rise to protection of the system equal to that of the chromate types of inhibitor without creating a potential health and safety hazard.

It is known that sodium dichromate is a good corrosion inhibitor for the piping, etc., wherein brine solutions circulate. These are known in the art as closed systems in view of the fact that any loss of liquid is due to leakage and not by evaporation or windage as occurs in a system open to the air.

In order to demonstrate that the inhibitors of this invention perform substantially equal to sodium dichromate, which is known to be highly toxic, both products were tested under simulated brine system conditions. Similarly our inhibitor was evaluated against other known non-toxic inhibitors as to corrosion inhibition in a simulated brine system.

The metal surfaces subject to the passage of a moving brine solution were simulated by suspending, via an inert holder, mild steel coupons, i.e., rectangular solid specimens 1" x 3" x 1/16", in a calcium chloride brine solution comprising additive and 24% CaCP₂ (specific gravity 1.2150) and rotating the coupons in the solution such that the velocity of the moving coupons is 1 foot per second. This was done for a three day period at ambient temperature with the solution pH at about 9.25.

Table III below contrasts the weight loss in mills per year (m.p.y.) of coupons treated as above with sodium dichromate and an embodiment of this invention which is:

| | Parts |
|---|---|
| N-alkyl-sulfonyl glycine | 90.0 |
| Phosphoric acid ester of octyl alcohol | 15.0 |
| Ethylene diamine tetraacetic acid tetra sodium salt monohydrate | 7.5 |
| Zinc ion | .5 |

TABLE III

| Additive | 0 p.p.m. | 450 p.p.m. | 1,800 p.p.m. |
|---|---|---|---|
| Na₂CrO₇, m.p.y | 14.8 | 0.44 | 0.49 |
| Embodiment of invention, m.p.y | 14.8 | 0.46 | 0.33 |

P.p.m.=parts of additive per million parts of brine solution.

Table IV below contrasts the weight loss in mills per year of coupons in the brine solution as described above wherein the additives were known substantially as non-toxic corrosion inhibitors.

TABLE IV

| Additive | 0 p.p.m. | 450 p.p.m. | 1,800 p.p.m. |
|---|---|---|---|
| 75% sodium nitrite | 14.8 | 10.8 | 4.6 |
| 25% sodium metaborate | | | |
| Sodium silicate 40 Bé | 14.8 | 10.5 | [1] 16.7 |
| Invention embodiment as described in Table III | 14.8 | 0.46 | 0.33 |

[1] The increase in corrosion in line 2 caused by the use of a higher level of additive is due to the increased amount or precipitate formed by the interaction of sodium silicate and the calcium chloride present in the brine.

It has long been a problem to protect metallic piping, pumps and other equipment used in oil wells from corrosion caused by the presence of brackish water, hydrogen sulfide, and other damaging causing liquids and gases. Presently, the art utilizes corrosion inhibitors that are based upon either an aliphatic or aromatic amine or amide. Present day inhibitors allow the piping, casings, etc. to be used for about 2 to 3 weeks before replacement of the parts becomes necessary. By the use of inhibitors within the scope of this invention, the service life of such equipment is greatly extended. In order to obtain a service life of this 2 to 3 weeks it is known in the art that treatment of the system must be applied at least once a day. By use of our treatment just once in an approximately equal amount as the prior art, service life is extended to a period of time exceeding three months.

In order to demonstrate the capability of products within the scope of this invention to so extend the service life of oil well pipes, casings, check valves, pumps, etc., a representative well in a field located in southern Texas which had been treated in the best mode available to the art for a period of about 15 years, was treated with a composition within the scope of this invention.

Prior art treatment procedures were accomplished by either continuously adding the inhibitor to the well in the manner known in the art or by intermittently adding inhibitor composition in the same manner. The method comprises pumping, pouring or otherwise adding the inhibitor into the annular space surrounding the pumping mechanism, during operation of the well. By this method, service life of the piping etc. averaged about two or three weeks.

When our composition was added by similar techniques to this well, and the piping, etc., was removed from service at the end of 106 days for reasons unconnected with the problem of corrosion, it was found that substantially no corrosion had occurred.

In a second well in the same field which had never had a service life for the assorted piping casings etc., of over 14 days for the two year period beginning in October 1967, our composition was applied. At the end of an initial thirty-five day period, the well was found still to be in uninterrupted operation.

It is known that at and beyond the point of junction of dissimilar metals, that corrosion will take place. This corrosion is caused by a difference in potential at the point of junction. Typical examples where such metal junctions are found include; the attachment of copper pipes to steel pipes in a water system; the combination of an aluminum engine block and a copper cored steel radiator as in an automobile; the attachment place of a stainless steel heat exchanger in a system constructed of mild steel, and perhaps in a system employing a "sacrificial anode."

To demonstate the effectiveness of our compositions as inhibitors for such junctions, a closed water system was created to simulate the flow of water through a multimetal pipe joint. The joint was simulated by inserting through a plurality of dissimilar metal coupons a steel threaded bolt. A steel nut was applied to the bolt. The interfaces of the coupons were separated by a single steel washer. These joints were rotated through an enclosed water bath at 180° F., the temperature of a closed recirculatory heating system, for about 4 days, said water bath containing about 100 parts of chloride ion per million parts of demineralized water.

EXAMPLE X

Disjointed individual coupons of steel, aluminum, copper and solder were separately subjected to corrosion in the separate water systems of the above described nature.

The corrosion rates for untreated coupons and those wherein a representative composition of this invention was added to the water bath were as follows:

| | Untreated, 0 p.p.m. additive | Treated, 4,000 p.p.m. additive |
|---|---|---|
| Steel, m.p.y | 188.0 | 0.4 |
| Aluminum, m.p.y | 0.4 | 0.0 |
| Copper, m.p.y | 0.2 | 0.0 |
| Solder, m.p.y | 11.6 | 0.1 |

When the bolted coupons, joined in the order steel aluminum, copper, solder utilizing the steel workers were similarly tested, the corrosion rates were found to be as follows:

| | Untreated, 0 p.p.m. additive | Treated, 4,000 p.p.m. additive |
|---|---|---|
| Steel, m.p.y | 169.00 | 0.17 |
| Aluminum, m.p.y | 7.60 | 0.15 |
| Copper, m.p.y | 0.34 | 0.00 |
| Solder, m.p.y | 44.00 | 33.00 |

It is known that water used in the cooling loops of a nuclear reactor should have a minimal level of conductivity. For this reason triple distilled water is normally used therein. Since ferrous metals are commonly used in the construction of such loops rapid corrosion will take place if an inhibitor is not utilized. However, prior art inhibitors of the chromates and nitrite/borate types cannot be utilized due to the fact that they dissociate to such an extent that they raise the conductivity of the water to an unaccepable level when used at their normally recommended dosages. Our compositions do not raise the conductivity of the water to an unacceptable level when utilized at their normal dosage.

EXAMPLE XI

At a leading Southeastern University wherein a substantial fast-breed nuclear model is installed, it was found that the cooling loops were corroding due to the lack of a suitable inhibitor. A representative composition of this invention comprising zinc ion, N-alkyl sulfonyl glycine, an octyl alcohol ester of phosphoric acid, and a polycarboxylic acid-polyamine chelating agent was added to the cooling water.

Coupons of a composition similar to that of the piping were inserted and suspended in the actual cooling loops such that the cooling water passed over them. By calculating the corrosion suffered by the coupons, a direct analogy can be made to the corrosion suffered by the internal surface of the cooling loop.

A steel coupon inserted for a period of 42 days was withdrawn and its corrosion rate was determined to be 0.016 m.p.y. For all practical purposes the protection afforded by use of our composition was 100% effective.

TABLE V

| Additive | Normal use concentration in p.p.m. | Conductivity in micromhos/cm. |
|---|---|---|
| None | 0.00 | 1.37 |
| Composition of example | 200 | 23.10 |
| | 300 | 30.24 |
| | 400 | 39.05 |
| Sodium dichromate | 1,000 | 1,200 |
| | 1,500 | 1,800 |
| | 2,000 | 2,200 |
| Nitrite/borate type | 1,000 | 1,300 |
| | 1,500 | 1,850 |
| | 2,000 | 2,350 |

In order to determine the efficacy of our inhibitors in open recirculating cooling water systems, tests were conducted in an apparatus designed to simulate the conditions found in such a system. The tests were conducted in the single tube heat exchanger apparatus described by E. A. Savinelli and O. Nowakowski in "Laboratory Corrosion Studies Using a Single Tube Heat Exchanger" presented at the 21st annual conference of the National Association of Corrosion Engineering on Mar. 17, 1965 at St. Louis, Mo., and published in Industrial Water Engineering, vol. 2, pp. 18–19, 24, June 1965. The steel heating surfaces had skin temperatures of about 322° F. The water flow rate was about two feet per second past the metal surface.

Three types of water were used for these tests; namely (A) deionized, (B) standard hard water, and (C) standard soft water.

Standard "hard water" contains 500 p.p.m. of chloride ions, 500 p.p.m. of sulfate ions, 0.2 p.p.m. of copper, 0.5 p.p.m. of iron and, as calcium carbonate equivalents, 300 p.p.m of calcium, 100 p.p.m. of magnesium, 20 p.p.m. of M.O. alkalinity, and 1646 p.p.m. of total dissolved solids.

Standard "soft water" contains 500 p.p.m. of sulfate ions, 500 p.p.m. chloride ions, and as equivalent calcium carbonate, 30 p.p.m. of calcium, 30 p.p.m. of magnesium and 9 p.p.m. of M.O. alkalinity.

In order to determine the efficacy of our inhibitors in closed recirculating cooling water systems, tests were conducted in an apparatus designed to simulate the conditions found in such a system. The tests were conducted in the single tube heat exchanger of Savinelli and Nowakowski as previously described but without aeration of the system.

In a 4 day run without the use of any corrosion inhibitor, the rates of corrosion for the A, B, and C water types were 182, 164, and 178 m.p.y., respectively. When repeated with numerous compositions within the scope of this invention, the corrosion rates were as follows:

| Test number | Composition number | Water type | System type | Corrosion rate, m.p.y. |
|---|---|---|---|---|
| 1 | 1 | H | C | 0.9 |
| 2 | 2 | H | C | 2.9 |
| 3 | 3 | S | C | 1.7 |
| 4 | 2 | S | C | 0.4 |
| 5 | 2 | H | O | 0.2 |
| 6 | 4 | H | O | 2.5 |
| 7 | 4 | H | C | 5.2 |
| 8 | 5 | H | O | 3.4 |

Composition 1 = 250 parts N-alkyl sulfonyl glycine, 50 parts phosphoric acid ester of octyl alcohol, 25 parts E.D.T.A., 5 parts zinc ion.
Composition 2 = 250 parts N-alkyl sulfonyl glycine, 50 parts phosphoric acid ester of octyl alcohol, 50 parts E.D.T.A., 5 parts zinc ion.
Composition 3 = 250 parts N-alkyl sulfonyl glycine, 50 parts phosphoric acid ester of octyl alcohol, 50 parts E.D.T.A., 10 parts zinc ion.
Composition 4 = 250 parts N-alkyl sulfonyl glycine, 50 parts phosphoric acid ester of octyl alcohol, 50 parts E.D.T.A., 5 parts copper ions.
Composition 5 = 250 parts N-alkyl sulfonyl glycine, 50 parts phosphoric acid ester of diethylene glycol monobutyl ether, 50 parts E.D.T.A., 5 parts zinc ion.

In order to demonstrate that the beneficial inhibitor characteristics obtained by the use of our compositions is due to the unique combination of the four ingredients, several inhibitor compositions were prepared wherein one or more of our constituents was omitted, and these were added to a standard hard water which contained standardized coupons for 4 days.

COMPOSITION A

Amino acid _____ 250 p.p.m. in the water.
Inorganic acid ester _____ 50 p.p.m. in the water.
Corrosion rate _____ 3.4 m.p.y.

Overall general pitting observed.

COMPOSITION B

Amino acid _____ 250 p.p.m. in the water.
Inorganic acid ester _____ 50 p.p.m. in the water.
Divalent metal ion _____ 5 p.p.m. in the water.
Corrosion rate _____ 2.3 m.p.y.

Under deposit corrosion observed.

COMPOSITION C

Amino acid _____ 250 p.p.m. in the water.
Inorganic acid ester _____ 50 p.p.m. in the water.
Chelating agent _____ 25 p.p.m. in the water.
Corrosion rate _____ 0.5 m.p.y.

Pitting was observed on the coupons.

COMPOSITION D—OUR INVENTION

Amino acid _____ 250 p.p.m. in the water.
Inorganic acid ester _____ 50 p.p.m. in the water.
Chelating agent _____ 25 p.p.m. in the water.
Divalent metal ion _____ 5 p.p.m. in the water.
Corrosion rate _____ 0.4 m.p.y.

No pitting observed on the coupons.

While the numerical indication of the corrosion rates of compositions C and D are substantially similar, the important difference is in the noted pitting, as the pitting amount will also influence the service life of the metal surface. For example if a 1,000 lb. section of piping loses 1 lb. of metal per year at a uniform rate over the entire surface area of the pipe, the pipe will theoretically last 1,000 years. Whereas, if the corrosion is localized in the form of one or more pits, there will occur in the pipe a hole in a substantially shorter period of time, due to the substantially faster than 1 lb./year localized rate of corrosion.

In order to determine the relative toxicity of representative compositions within the scope of this invention a typical one was submitted to an independent testing laboratory for the conductance of toxicity studies.

White rats of uniform weight, after 12 hours of fasting, received orally, the test material at various dose levels. All animals were observed carefully for toxic signs.

Graduated doses were administered from 2 gm. of test material/kg. of rat body weight, to 30 gm./kg. to 2 rats at each dose level. At no time were signs of toxicity observed. Finally, ten rats, 5 males and 5 females, were given doses of 30 gm./kg. No deaths or signs of toxicity were obtained.

When the animals were autopsied 14 days after dosage, no gross aberrations in any organs were observed.

Therefore, the oral lethal dosage for a lower mammal is considered to be in excess of 30 grams of material per kilogram of body weight. From this it can be said that the $LD_{50}$ (i.e., the lethal dose for 50% of the test sample) is at least in excess of 30 gms./kg. Whereas, for such chemicals as sodium chloride (table salt) the $LD_{50}$ is 2.6 gms./kg. and for 10% acetic acid (household vinegar) the $DL_{50}$ is 3.53 gms./kg.

As previously mentioned the compositions of this invention are considered safe to handle. They are not only non-toxic, but are substantially non-staining. This is not the case with the well used sodium dichromate based corrosion inhibitors.

Whereas silicates, phosphate, nitrite/borate, and chromate types of inhibitors are considered in the art to be abrasive, within the definition used in the art, ours are considered to be non-abrasive. As such when employed in a circulating water system, upon evaporation of the water that contains one of our compositions, there remains a residue which will not scar, mar, or otherwise mutilate valve seats, pistons, or other metal parts which are fitted to close tolerances.

It is seen that the compositions of this invention can be utilized in open and closed hot water systems in the same manner as in the described cold water systems.

It is readily seen that the compositions and processes of this invention can be applied not only to industrial applications, but also for application in the marine industry, for example cooling systems which would be found in factories would be treated in a manner similar to cooling systems found in a vessel.

Since certain changes may be made in the above products and processes without departing from the scope of the invention herein involved, it is intended that all matter contained in the above description shall be interpreted as illustrative and not in a limiting sense.

We claim:

1. A composition for inhibiting metallic corrosion comprising:

(a) at least one compound having the following structural formula:

$$X-N-(CH_2)_m-\overset{O}{\overset{\|}{C}}-O-Y$$
$$\begin{array}{c} | \\ Z \\ | \\ (CH_2)_n \\ | \\ CH_2 \\ | \\ H \end{array}\Bigg]_q$$

wherein X is a member of the group consisting of hydrogen and an alkyl group containing from 1 to 6 carbon atoms, inclusive, Y is selected from the group consisting of hydrogen, an alkali metal, and an ammonium radical, Z is selected from the group consisting of:

$$-\overset{O}{\overset{\|}{C}}-, \quad -\overset{O}{\overset{\|}{C}}-, \quad -\overset{O}{\overset{\|}{C}}-NH-, \text{ and } -\overset{O}{\overset{\|}{P}}-O$$
$$\qquad\qquad\qquad\qquad\qquad\qquad\qquad\qquad |$$
$$\qquad\qquad\qquad\qquad\qquad\qquad\qquad\qquad OH$$

$m$ is an integer of from 1 to 6 inclusive, $n$ is a number of from 0 to 6 inclusive and when $n$ is six, the six carbon atoms may be present as an alkylene, cycloalkylene or an arylene group, each with the requisite number of hydrogen atoms for the group, and $q$ is 1 or 0;

(b) at least one ester which is selected from the group consisting of phosphoric acid and boric acid esters of a compound selected from the group consisting of octyl and nonyl alcohols, a phenol, an ethylene glycol, a triethanol amine, a diethylene glycol and an ethoxylated fatty acid;

(c) at least one water soluble chelating agent selected from the group consisting of:

(1) a compound having the following structural formula:

$$W-\Bigg[\overset{Z}{\overset{|}{N}}-R\Bigg]_r-\overset{Z}{\overset{|}{N}}-Z$$

wherein W is selected from the group consisting of $CH_2COOM$ and $CH_2CH_2COOM$; each Z is selected from the group consisting of —H, $CH_2COOM$ and $CH_2CH_2COOM$, M is selected from the group consisting of —H, $CH_2CH_2OH$, an alkali metal, and an ammonium radical, R is a hydrocarbon having from 2–6 carbon atoms; $r$ is integer from 0–4, (2) a hydroxy polycarboxylic acid,
   (3) a nitrilo polyacetic acid, and
   (4) an amino lower alkylphosphonic acid and salts thereof;

(d) at least one water soluble salt of a metal selected from the group consisting of zinc, cadmium, copper, nickel and strontium, said component (a) being present in an amount from about 50 to about 98.5 parts, component (b) in an amount from about 7.5 to about 30 parts, component (c) in an amount from about 2.5 to about 15 parts and component (d) in an amount from about 0.5 to about 5 parts, all by weight, based on 100 parts of the composition.

2. The composition of claim 1 wherein component (b) is an ester of phosphoric acid.

3. The composition of claim 2 wherein component (d) is a water soluble salt of copper.

4. The composition of claim 2 wherein component (d) is a water soluble salt of zinc.

5. The composition of claim 1 wherein component (a) is N-alkyl sulfonyl glycine, component (b) is a phosphoric acid ester of octyl alcohol; component (c) is ethylene diamine tetraacetic acid and component (d) is a water soluble salt of zinc.

6. The composition of claim 1 wherein component (a) is N-alkyl sulfonyl glycine; component (b) is a phosphoric acid ester of diethylene glycol monobutyl ether, component (c) is ethylene diamine tetraacetic acid and component (d) is a water soluble salt of zinc.

7. The composition of claim 1 wherein component (a) is N-alkyl sulfonyl glycine; component (b) is a phosphoric acid ester of octyl alcohol; component (c) is ethylene diamine tetraacetic acid and component (d) is a water soluble salt of copper.

8. The composition of claim 1 wherein component (a) is glycine, component (b) is a boric acid ester of ethylene glycol; component (c) is nitrilo triacetic acid and component (d) is a water soluble salt of cadmium.

9. The composition of claim 1 wherein component (b) is an octyl alcohol ester of phosphoric acid.

10. The composition of claim 1 wherein component (b) is a nonyl alcohol ester of phosphoric acid.

11. A composition for inhibiting metallic corrosion comprising:

(a) at least one compound selected from the group consisting of an N-alkyl sulfonyl glycine, N-paratoluenesulfonyl glycine, glycine, p-aminobenzoyl glycine and the alkali metal and ammonium salts thereof;

(b) at least one ester which is selected from the group consisting of phosphoric acid and boric acid esters of a compound selected from the group consisting of octyl and nonyl alcohols, a phenol, an ethylene glycol, a triethanol amine, a diethylene glycol and an ethoxylated fatty acid;

(c) at least one water soluble chelating agent selected from the group consisting of:

(1) a compound having the following structural formula:

$$W-\Bigg[\overset{Z}{\overset{|}{N}}-R\Bigg]_r-\overset{Z}{\overset{|}{N}}-Z$$

wherein W is selected from the group consisting of $CH_2COOM$ and $CH_2CH_2COOM$; each Z is selected from the group consisting of —H, $CH_2COOM$ and $CH_2CH_2COOM$, M is selected from the group consisting of —H, $CH_2CH_2OH$, an alkali metal, and an ammonium radical, R is a hydrocarbon having from 2–6 carbon atoms; $r$ is integer from 0–4, (2) a hydroxy polycarboxylic acid,
   (3) a nitrilo polyacetic acid, and
   (4) an amino lower alkylphosphonic acid and salts thereof;

(d) at least one water soluble salt of a metal selected from the group consisting of zinc, cadmium, copper, nickel and strontium, said component (a) being present in an amount from about 50 to about 89.5 parts, component (b) in an amount from about 7.5 to about 30 parts, component (c) in an amount from about 2.5 to about 15 parts and component (d) in an amount from about 0.5 to about 5 parts, all by weight, based on 100 parts of the composition.

12. The composition of claim 11 wherein component (b) is an ester of phosphoric acid.

13. The composition of claim 12 where component (d) is a water soluble salt of copper.

14. The composition of claim 10 wherein component (d) is a water soluble salt of zinc.

15. The composition of claim 11 wherein component (a) is p-aminobenzoyl glycine; component (b) is a phosphoric acid ester of nonyl phenol, component (c) is ethylene diamine tetraacetic acid and component (d) is nickel ion.

16. The composition of claim 11 wherein component (b) is an octyl alcohol ester of phosphoric acid.

17. The composition of claim 11 wherein component (b) is a nonyl alcohol ester of phosphoric acid.

18. A process for inhibiting corrosion upon a metal surface subject to corrosion comprising: treating the metal surface with a corrosion inhibiting amount of the composition of claim 1.

19. A process for inhibiting corrosion upon a metal surface subject to corrosion comprising: treating the metal surface with a corrosion inhibiting amount of the composition of claim 2.

20. A process for inhibiting corrosion upon a metal surface subject to corrosion comprising: treating the metal surface with a corrosion inhibiting amount of the composition of claim 3.

21. A process for inhibiting corrosion upon a metal surface subject to corrosion comprising: treating the metal surface with a corrosion inhibiting amount of the composition of claim 4.

22. A process for inhibiting corrosion upon a metal surface subject to corrosion comprising: treating the metal surface with a corrosion inhibiting amount of the composition of claim 5.

23. A process for inhibiting corrosion upon a metal surface subject to corrosion comprising: treating the metal surface with a corrosion inhibiting amount of the composition of claim 6.

24. A process for inhibiting corrosion upon a metal surface subject to corrosion comprising: treating the metal surface with a corrosion inhibiting amount of the composition of claim 7.

25. A process for inhibiting corrosion upon a metal surface subject to corrosion comprising: treating the metal surface with a corrosion inhibiting amount of the composition of claim 8.

26. A process for inhibiting corrosion upon a metal surface subject to corrosion comprising: treating the metal surface with a corrosion inhibiting amount of the composition of claim 9.

27. A process for inhibiting corrosion upon a metal surface subject to corrosion comprising: treating the metal surface with a corrosion inhibiting amount of the composition of claim 10.

28. A process for inhibiting corrosion upon a metal surface subject to corrosion comprising: treating the metal surface with a corrosion inhibiting amount of the composition of claim 11.

29. A process for inhibiting corrosion upon a metal surface subject to corrosion comprising: treating the metal surface with a corrosion inhibiting amount of the composition of claim 12.

30. A process for inhibiting corrosion upon a metal surface subject to corrosion comprising: treating the metal surface with a corrosion inhibiting amount of the composition of claim 13.

31. A process for inhibiting corrosion upon a metal surface subject to corrosion comprising: treating the metal surface with a corrosion inhibiting amount of the composition of claim 14.

32. A process for inhibiting corrosion upon a metal surface subject to corrosion comprising: treating the metal surface with a corrosion inhibiting amount of the composition of claim 15.

33. A process for inhibiting corrosion upon a metal surface subject to corrosion comprising: treating the metal surface with a corrosion inhibiting amount of the composition of claim 16.

34. A process for inhibiting corrosion upon a metal surface subject to corrosion comprising: treating the metal surface with a corrosion inhibiting amount of the composition of claim 17.

References Cited

UNITED STATES PATENTS

| | | | |
|---|---|---|---|
| 3,121,016 | 2/1964 | Forinash et al. | 252—391 |
| 3,350,305 | 10/1967 | Langguth et al. | 252—389 |
| 3,397,150 | 8/1968 | Burt et al. | 252—389 |
| 3,510,436 | 5/1970 | Silverstein et al. | 252—389 |
| 3,518,203 | 6/1970 | Savinelli et al. | 21—2.7 |
| 3,553,150 | 1/1971 | Rosenwald et al. | 106—14 |

LEON D. ROSDOL, Primary Examiner

I. GLUCK, Assistant Examiner

U.S. Cl. X.R.

21—2.5, 2.7; 106—14; 117—127; 148—6.15 R, 6.15 Z; 176—92 B; 252—181, 391